(12) United States Patent　　(10) Patent No.:　　US 6,629,699 B2
Hurlburt　　(45) Date of Patent:　　Oct. 7, 2003

(54) ADJUSTABLE BOGEY BEAM SUPPORT FOR UTILITY VEHICLES

(75) Inventor: Joseph C. Hurlburt, Lancaster, PA (US)

(73) Assignee: New Holland North America, Inc., New Holland, PA (US)

( * ) Notice: Subject to any disclaimer, the term of this patent is extended or adjusted under 35 U.S.C. 154(b) by 52 days.

(21) Appl. No.: 10/085,948

(22) Filed: Feb. 28, 2002

(65) Prior Publication Data

US 2003/0159871 A1 Aug. 28, 2003

(51) Int. Cl.[7] .............................. B62D 6/10; B60G 5/01
(52) U.S. Cl. ..................... 280/124.111; 280/124.116; 180/22; 180/24.12
(58) Field of Search ................... 280/104, 676, 280/677, 678, 680, 681, 124.111, 124.113, 124.116; 180/24.11, 24.12, 350, 351, 357, 22

(56) References Cited

U.S. PATENT DOCUMENTS

| | | | | |
|---|---|---|---|---|
| 2,775,466 A | * | 12/1956 | Meewes | 280/677 |
| 3,370,665 A | * | 2/1968 | Stanaback | 180/24.11 |
| 3,504,928 A | * | 4/1970 | Reimer | 280/104 |
| 3,506,079 A | * | 4/1970 | Madler et al. | 280/124.111 |
| 4,211,297 A | * | 7/1980 | Dunbar | 280/124.113 |
| 4,664,208 A | * | 5/1987 | Horiuchi et al. | 180/22 |
| 6,536,545 B1 | * | 3/2003 | Hurlburt | 280/124.111 |
| 2002/0157891 A1 | * | 10/2002 | Hurlburt | 180/264 |

* cited by examiner

Primary Examiner—Peter C. English
(74) Attorney, Agent, or Firm—John William Stader; Rebecca L. Henkel

(57) ABSTRACT

A utility vehicle is provided with a bogey beam on which are mounted the steering axle at the forward end of the bogey beam and the middle axle on the rearward end of the bogey beam. A rear drive axle is supported by the frame of the utility vehicle. The bogey beam is connected to the frame by a pivot assembly defining a transverse pivot axis about which the bogey beam can oscillate. The weight transferred to the bogey beam is proportionately distributed between the front steering axle and middle axle. As a result, the steering characteristics of the steering axle are not impaired by the imposition of a load in the load bed of the utility vehicle, as the middle axle cannot be loaded sufficiently to overpower the front steering axle. The middle axle is rotatably driven by a chain drive transferring rotational power from the rear drive axle. The bogey, beam is provided with a plurality of pivot axis locations to vary the proportions of the load applied to the front and middle axles as a result of the longitudinal movement of the bogey beam pivot.

11 Claims, 8 Drawing Sheets

ADJUSTABLE BOGEY BEAM SUPPORT FOR UTILITY VEHICLES

FIELD OF THE INVENTION

The present invention relates generally to off-road motor vehicles, such as utility or recreational vehicles, and more particularly, to an adjustable bogey beam support apparatus for the front and middle axles of a utility vehicle to vary the distribution of load between the front and middle axles.

BACKGROUND OF THE INVENTION

Small off-road vehicles such as utility or recreational vehicles are becoming popular for recreational and other general purpose off-road usage. Such utility vehicles can be found in U.S. Pat. No. 4,706,770. These utility vehicles have found usage on golf courses and at sporting events, and are particularly adaptable for utilization on a farm. This type of flexibility in the wide variety of uses necessitates a vehicle that is highly flexible, highly maneuverable and the like. This demands a vehicle that will afford a high degree of maneuverability and ease of steering.

Steering characteristics of known utility vehicles provide poor turning performance. Known utility vehicles have turning clearance circles having a diameter greater than twenty-one feet. The use of independent front wheel suspension mechanisms on known utility vehicles, coupled with the mounting of the rack and pinion systems on the frame of the vehicle, introduces minor king pin rotations as the steering tires ride over ground undulations. Such construction reduces steering precision and can accelerate the wear of the tires on the steering axle.

Placing a load on the utility vehicle typically results in a variation in the steering performance of known utility vehicles. For example, one known embodiment having a front steering axle, a rear drive axle, and a middle drive axle carries the load placed on the vehicle on the middle and rear axles, resulting in proportionately less weight on the steering axle and a reduction in maneuverability. Accordingly, known utility vehicle construction results in a significant influence on the steering performance by the load carried on the vehicle. Preferably, loads should not change the steering characteristics for any vehicle.

Furthermore, conventional utility vehicle construction mounts the middle axle directly to the frame of the vehicle, resulting in a harsh ride characteristic and direct application of any load placed into the load bed onto the middle axle as well as the rear drive axle. It would, therefore, be desirable to enhance the ride characteristics, as well as the steering performance of utility vehicles by distributing the weight of the loads being carried in a different manner.

Steering characteristics can be varied by changing the load applied to the front and middle axles. Depending on the steering characteristics desired by the operator, it would be advantageous to be able to vary the proportional distribution of the load applied to the front and middle axles.

It is therefor desirable to provide a utility and recreational vehicle that overcomes the disadvantages of the known prior art utility vehicles.

SUMMARY OF THE INVENTION

Accordingly, an important object of the present invention is to provide a middle axle for a utility vehicle that is not directly mounted to the frame of the vehicle.

It is another object of this invention to provide a bogey beam apparatus for supporting the front and middle axles on a utility vehicle.

It is a further object of this invention to provide support for the middle axle of a utility vehicle in such a manner as to prevent the load placed thereon from overcoming the steering operation of the front axle.

It is a feature of this invention to add a bogey beam extending longitudinally at the center line of the utility vehicle to interconnect the front and middle axles.

It is another feature of this invention that a portion of the load placed into the load bed of the utility vehicle will be distributed to the bogey beam to be re-distributed to the front and middle axles in a predetermined proportion.

It is still another object of this invention to provide an adjustable pivot mechanism for the bogey beam to vary the proportional loading between the front and middle axles.

It is still another feature of this invention that the proportional loading between the front and middle axles can be varied at the discretion of the operator.

It is an advantage of this invention that maneuverability of the utility vehicle is preserved during load bearing operations.

It is another advantage of this invention that the steering characteristics of a utility vehicle can be adapted to the desires of the operator by changing the proportional loading between the front and middle axles.

It is still another advantage of this invention that the ride characteristics-of a utility vehicle are improved, particularly under load bearing conditions.

It is still another feature of this invention that the loads placed on the load bed of the utility vehicle are proportionally distributed between the front steering axle and the middle drive axle of the utility vehicle.

It is a further object of this invention to provide a bogey beam mechanism for an off-road vehicle that is durable in construction, inexpensive to manufacture, carefree in maintenance, easy to assemble, and simple and effective in use.

These and other objects, features, and advantages are accomplished according to the present invention by providing a utility vehicle having a bogey beam on which are mounted the steering axle at the forward end of the bogey beam and the middle axle on the rearward end of the bogey beam. A rear drive axle is supported directly on or suspended from the frame of the utility vehicle. The bogey beam can be rigidly or resiliently connected to the frame by a pivot assembly defining a transverse pivot axis about which the bogey beam can oscillate. The weight transferred to the bogey beam is proportionately distributed between the front steering axle and middle axle. As a result the steering characteristics of the steering axle are not impaired by the imposition of a load in the load bed of the utility vehicle, as the middle axle cannot be loaded sufficiently to overpower the front steering axle. The bogey beam is provided with a plurality of pivot axis locations to vary the proportions of the load applied to the front and middle axles as a result of the longitudinal movement of the bogey beam pivot.

The foregoing and other objects, features, and advantages of the invention will appear more fully hereinafter from a consideration of the derailed description that follows, in conjunction with the accompanying sheets of drawings. It is to be expressly understood, however, that the drawings are for illustrative purposes and are not to be construed as defining the limits of the invention.

BRIEF DESCRIPTION OF THE DRAWINGS

The advantages of this invention will be apparent upon consideration of the following detailed disclosure of the invention, especially when taken in conjunction with the accompanying drawings wherein.

DETAILED DESCRIPTION OF THE:PREFERRED EMBODIMENTS

Figure 1:
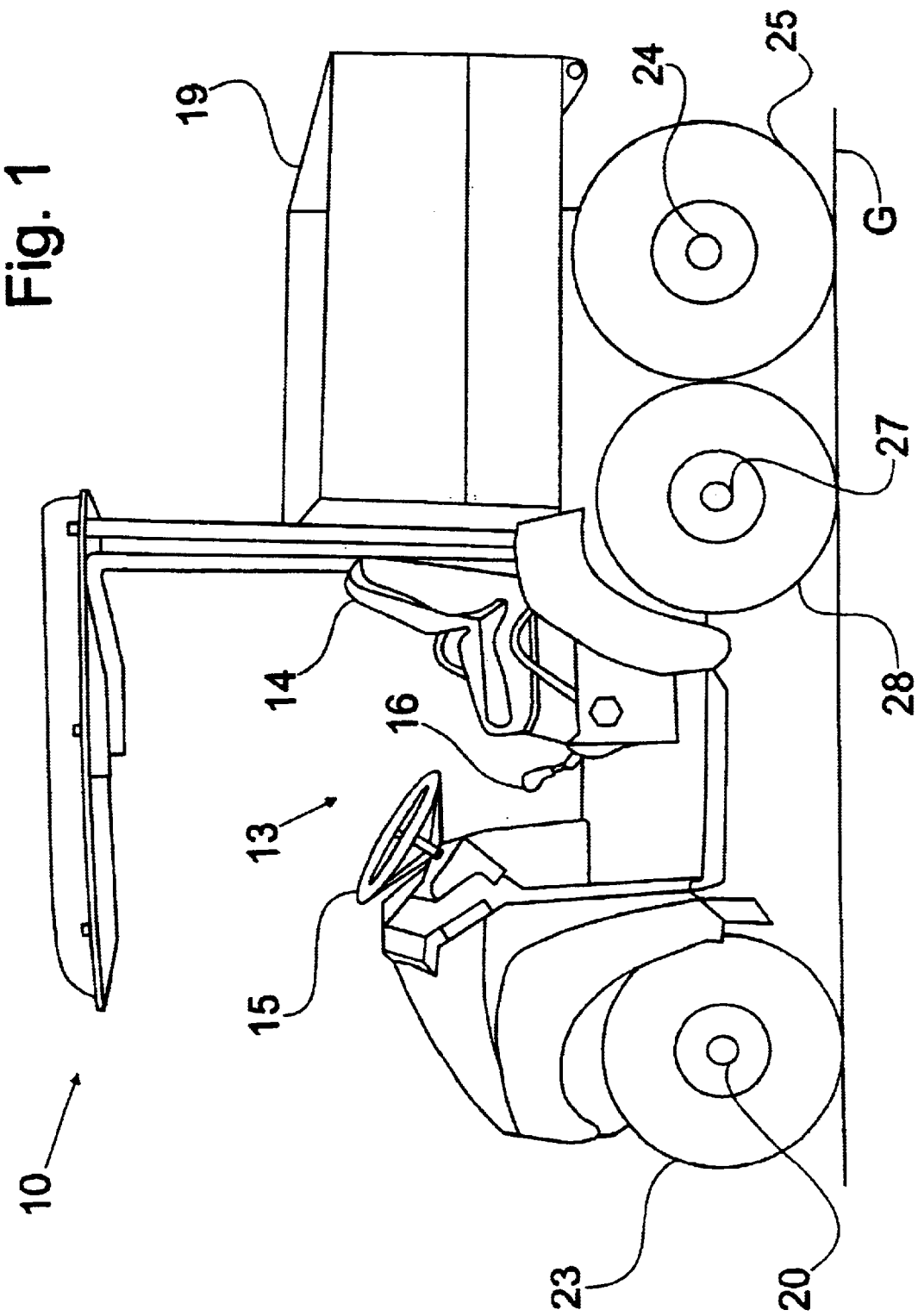
FIG. 1 is side perspective view of a utility vehicle incorporating the principles of the present invention.
Figure 2:
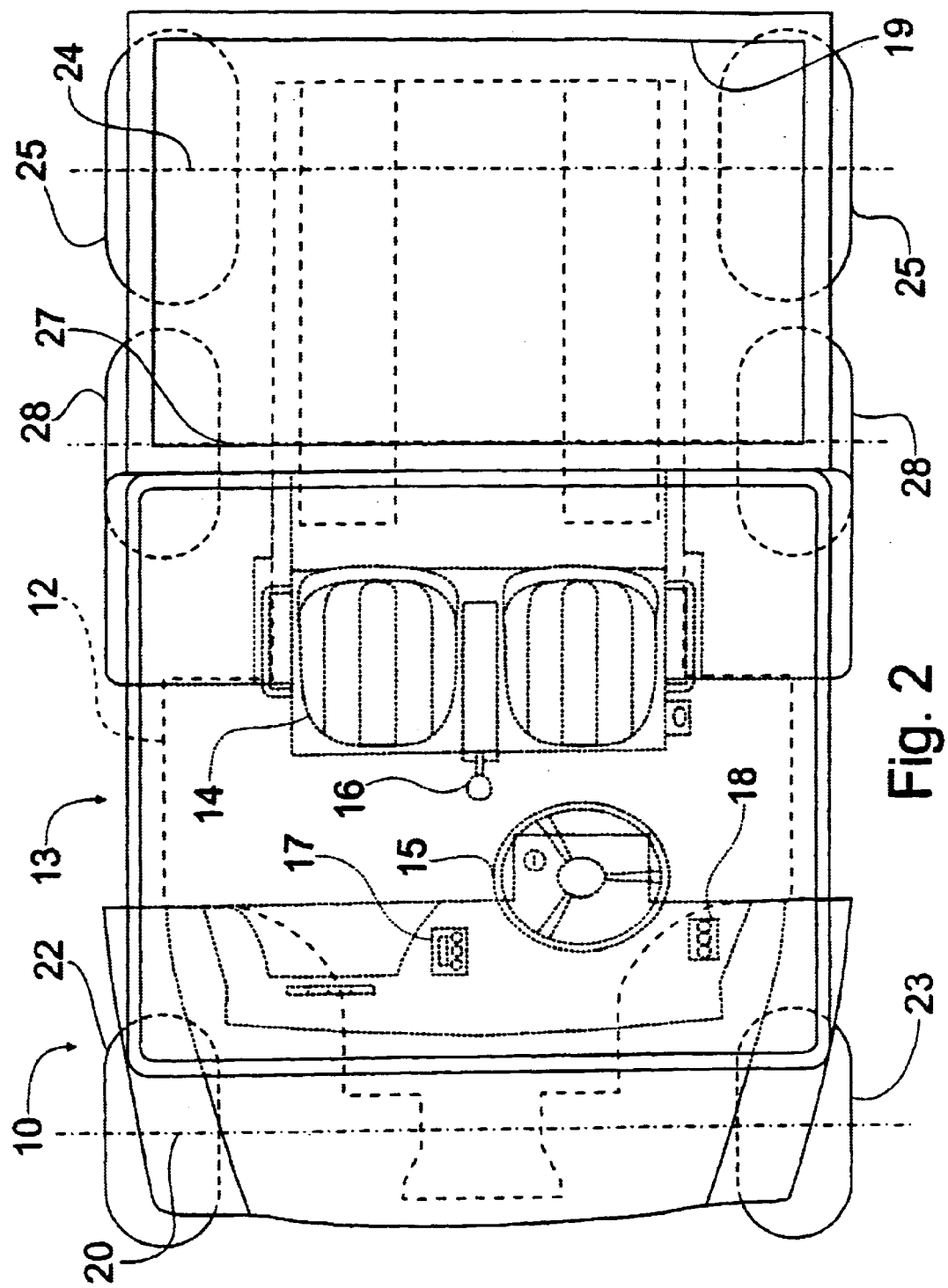
FIG. 2 is a top plan view of the utility, vehicle of FIG. 1, the seats and control apparatus being shown in dashed lines, the frame and axles being shown in phantom.
Figure 3:
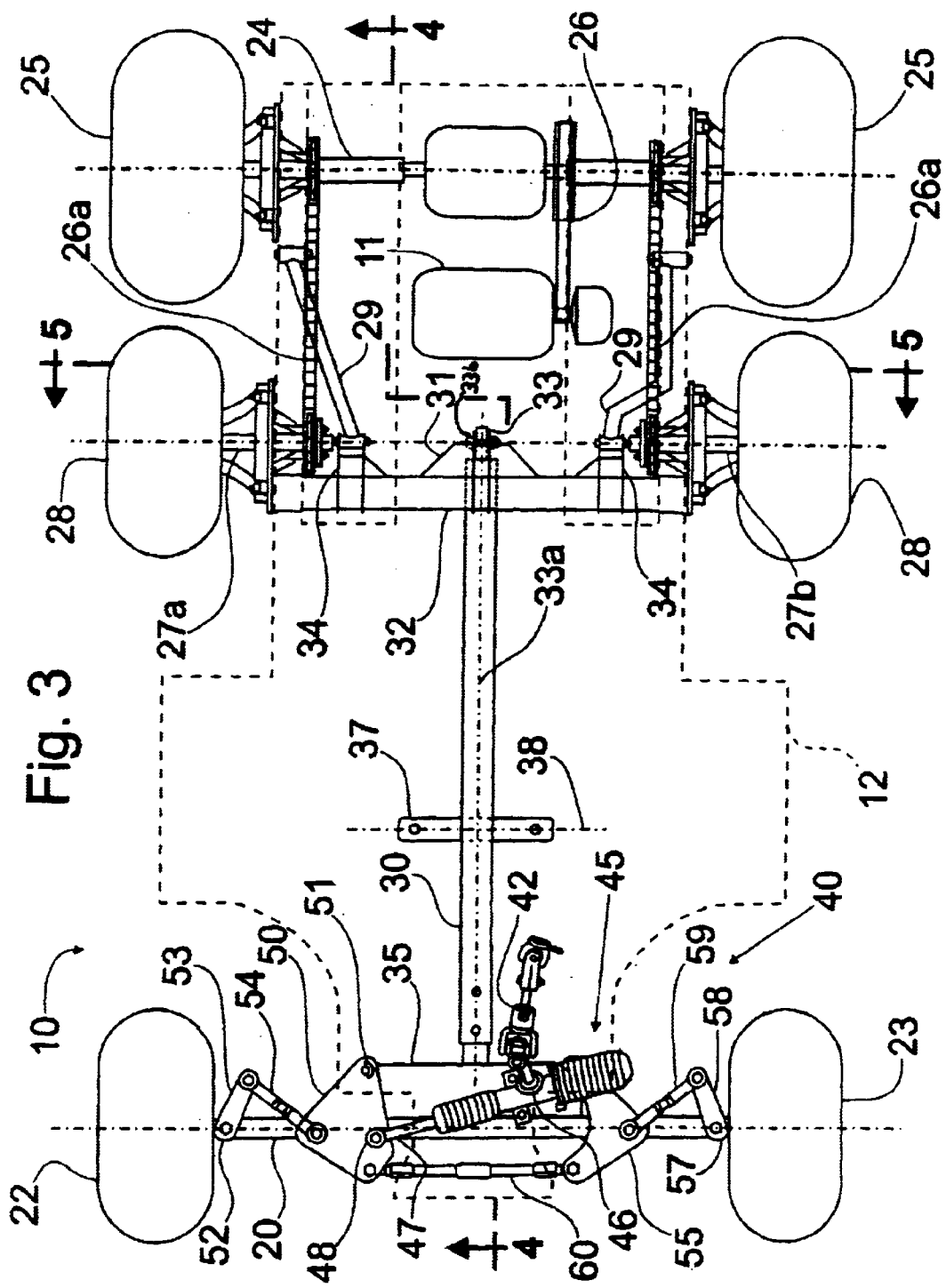
FIG. 3 is a top plan view of the frame and drive mechanism with the chassis removed for purposes of clarity.

Referring to FIGS. 1–3, a utility vehicle incorporating the principles of the present invention can best be seen. Any left and right references are used as a matter of convenience and are determined by standing at the rear of the vehicle and facing forwardly into the direction of travel.

The utility vehicle 10 includes a frame 12 supported above the ground G by a pair of steered wheels 22, 23 mounted on a front steering axle 20 and by a pair of driven wheels 25 mounted on a rear drive axle 24. In the preferred embodiment depicted in FIGS. 1–3, a middle drive axle 27 is also provided with a pair of opposing support wheels 28. The frame 12 supports an operator compartment 13 including seats 14 for the comfort of the operator and control apparatus, such as a conventional steering wheel 15 and a gear shift lever 16. A throttle control 17 and a brake control 18, along with other conventional control devices, are also included within the operator compartment 13 for the control of the vehicle 10. The frame 12 also supports a load bed 19 rearwardly of the operator compartment 13 over the middle and rear drive axles 27, 24 respectively, to carry cargo over the surface of the ground G.

Referring now to FIG. 3, the frame 12 with the axles 20, 24, 27 mounted thereon can best be seen. The rear drive axle 24 is rotatably supported on the frame 12 and is powered by a drive mechanism 26 powered by an engine 11 supported by the frame 12. The middle axle 27 is pivotally supported from the frame 12 by a pair of support links 29 and is connected to the rearward end of a bogey beam 30, which will be described in greater detail below. The middle axle 27 is preferably formed as a pair of stub shafts 27a, 27b connected to said respective support links 29. A support beam 32 is pivotally mounted on a rearward end of the bogey beam 30 for oscillatory movement about a longitudinally extending pivot axis 33a. The support wheels 28 on the middle axle 27 are driven by respective chain drives 26a to provide a four wheel drive capability for the vehicle 10.

Front axle 20 and the mounting member 35 are attached to the forward end of the bogey beam 30. Bogey beam 30 is pivotally connected to the frame 12 by a pivot assembly 37 positioned beneath the operator compartment 13 to provide an oscillation of the bogey beam 30 about the transverse pivot axis 38. Accordingly, the front steering axle 20 and the middle axle 27 generally oscillate in opposing vertical directions on opposite ends of the bogey beam 30 due to the pivotal mounting thereof by the pivot assembly 37.

The pivot assembly 37 can be formed as a simple pin pivotally connecting the bogey beam 30 to the frame 12 of the vehicle 10 to define the transverse pivot axis 38, as is shown in the drawings. The pivot assembly 37 can also suspend the bogey beam 30 from the frame 12 by providing a link (not shown) that pivotally connects at one end to the bogey beam 30 and is centrally connected to the frame 12 with the opposing end of the link being connected to a spring mechanism (not shown) that provides some resiliency between the bogey beam 30 and the frame 12. Under such a suspended bogey beam arrangement, the transverse pivot axis 38 would be located at the pivotal connection between the link (not shown) and the bogey beam 30, but would be vertically movable relative to the frame 12 about the pivotal connection between the link (not shown) and the frame 12, the spring mechanism (not shown) interconnecting the frame 12 and the link (not shown) to offset forces encountered by the bogey beam 30. The location of the central pivot on the link (not shown), pivotally connecting the link to the frame 12, being positioned between the opposing ends of the link to provide the desired resiliency for the selected size of the spring mechanism.

Any load placed in the load bed 19 will be transferred to the rear axle 24 through the mounting thereof with the frame 12 and to the bogey beam 30 via the pivot assembly 37. The weight carried by the bogey beam 30 will be shared in a proportionate manner between the front steering axle 20 and the middle axle 27. The respective proportions will be determined by the location of the pivot assembly 37 along a length of the bogey beam 30. Accordingly, any load transferred to the bogey beam 30 will always be proportionately divided between the front steering axle 20 and the middle axle 27. As a result, the steering characteristics will not be impacted by any load placed into the load bed 19, as the middle axle 27 cannot overpower the front steering axle 20.

The front steering axle 20 is operatively associated with a steering mechanism 40 to effect turning movement of the steered wheels 22, 23. The steering mechanism 40 is actuated through manipulation of the steering wheel 15 by the operator through the universal connecting linkage 42. The steering mechanism 40 includes a rack and pinion assembly 45 which includes a conventional pinion 46 rotatably associated with the steering wheel 15 and a conventional rack 47 that is linearly movable in conjunction with the rotation of the pinion 46 in a known manner.

The rack 47 is pivotally connected to a first bell crank 50 at a first connection point 48. The first bell crank 50 is pivotally mounted on the mounting member 35 for movement about a pivot 51. The connection point 48 is positioned forwardly of the pivot 51 to effect pivotal movement of the first bell crank. The right steered wheel 22 includes a spindle 52 having a steering arm 53 extending rearwardly therefrom. The first bell crank 50 is connected to the right steering arm 53 by a steering link 54 that extends laterally and rearwardly from the first bell crank 50 to the rearward end of the steering arm 53.

The steering mechanism 40 also includes a second bell crank 55 pivotally mounted on the mounting member 53 for movement about a pivot (not shown). The second bell crank 55 is connected to the first bell crank 50 by a tie rod 60 for coordinated movement therebetween. Accordingly, pivotal movement of the first bell crank 50 is transferred to the second bell crank 55 through connection with the tie rod 60. The left steered wheel 23 includes a spindle 57 having a steering arm 58 extending rearwardly therefrom. The second bell crank 55 is connected to the left steering arm 58 by a steering link 59 that extends laterally and rearwardly from the second bell crank 55 to the rearward end of the steering arm 58. Accordingly, the left and right steered wheels 22, 23 are steered in concert with one another in response to a manipulation of the steering wheel 15 by the operator.

Figure 4:
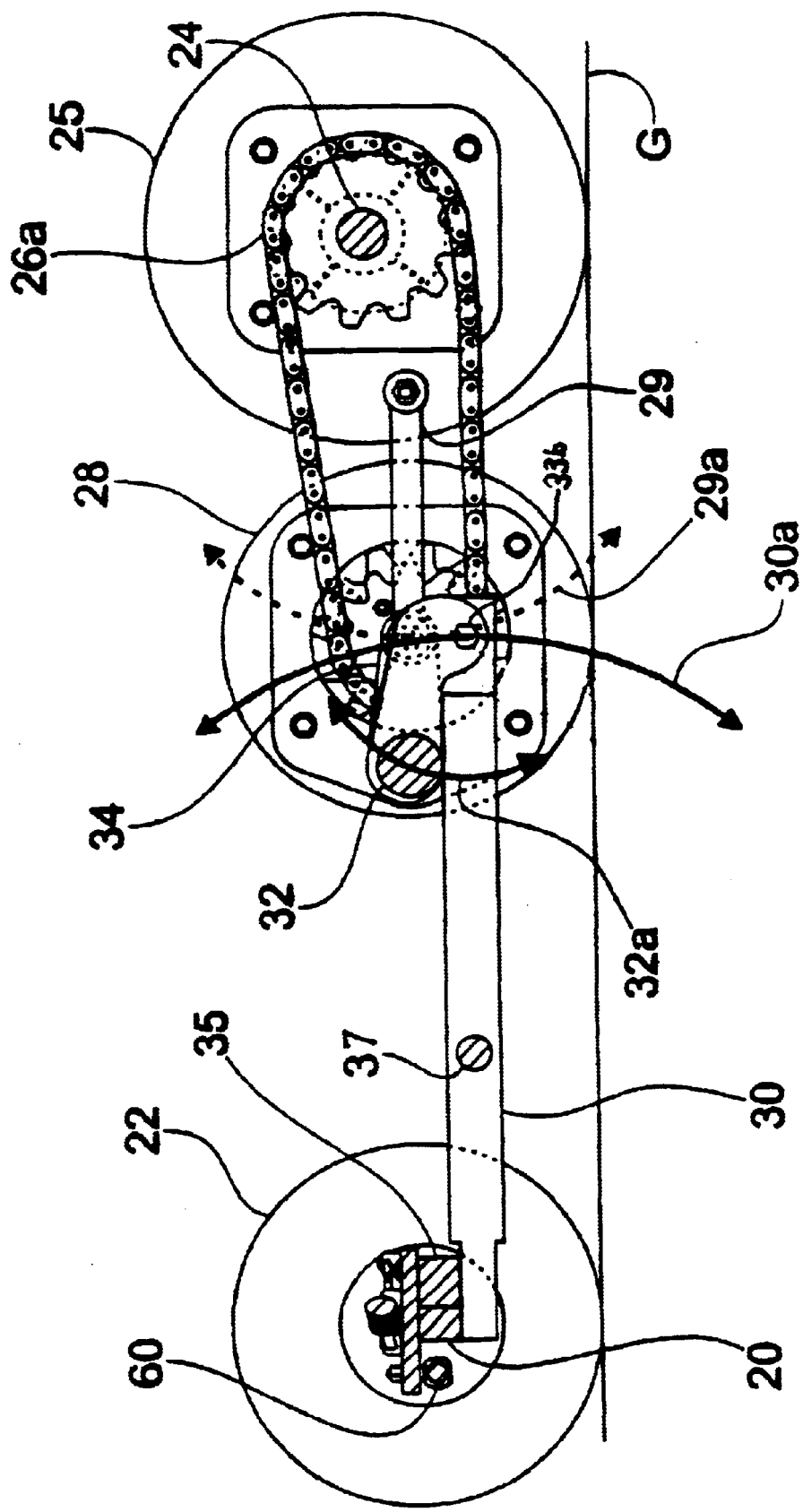
FIG. 4 is an enlarged cross-sectional view of the utility vehicle taken along lines 4—4 of FIG. 3 to show the drive mechanism and the orientation of the bogey beam supporting the front steering axle and the middle drive axle.
Figure 5:
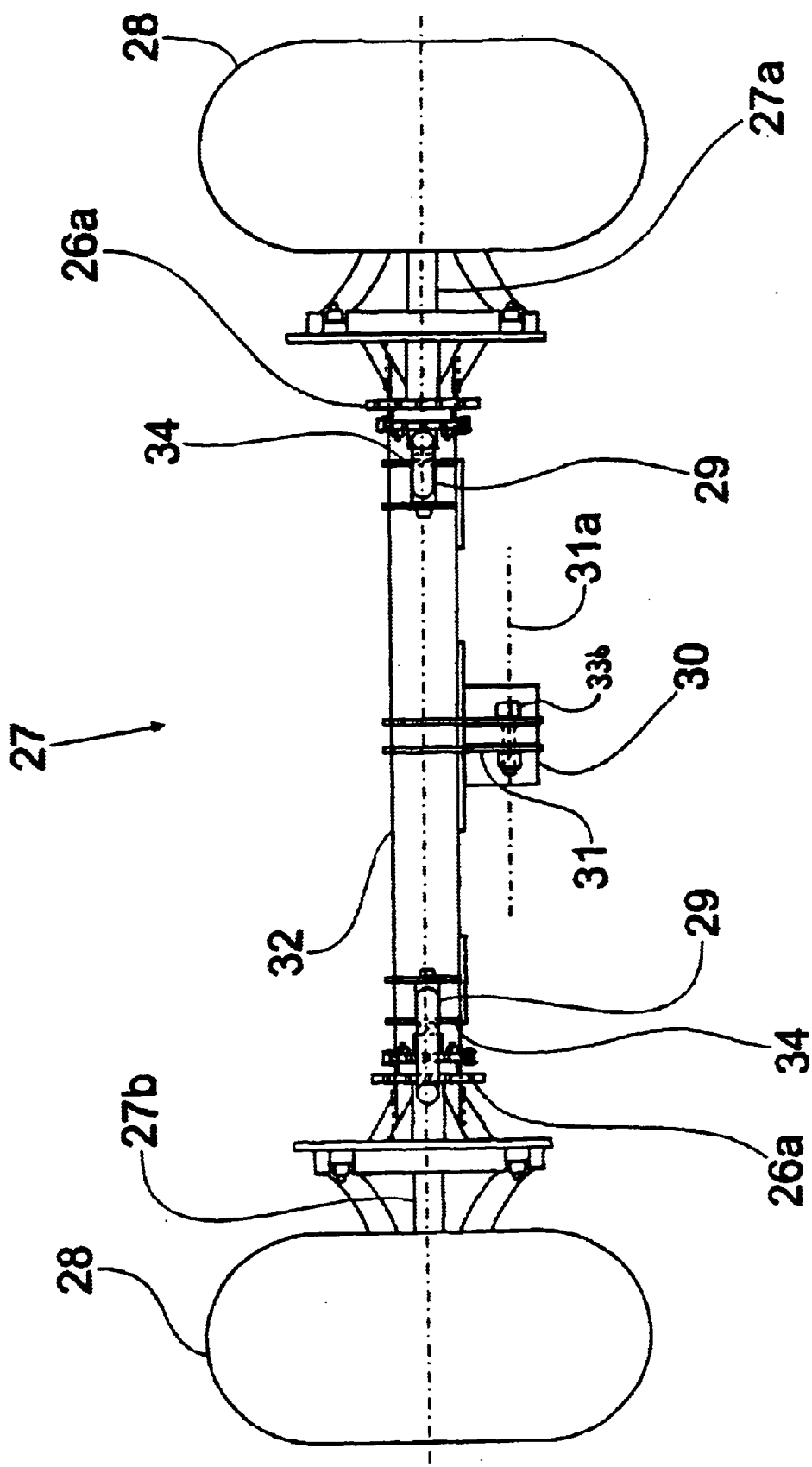
FIG. 5 is an enlarged cross-sectional view of the utility vehicle taken along lines 5—5 of FIG. 3 to show an elevational view of the middle drive axle.

Referring now to FIGS. 3–5, the details of the bogey beam construction and the support of the middle drive axle 27 can best be seen. The support beam 32 at the rear end of the bogey beam 30 has the stub axles 27a, 27b mounted directly to the laterally opposing ends of the support beam 32. The support beam 32 further has a pair of mounting brackets 34 projecting rearwardly therefrom interiorly of the stub shafts 27a, 27b to pivotally connect with the support links 29. The support links 29 pivotally interconnect the frame 12 just forwardly of the rear drive axle 24 and the mounting brackets 34 on the support beam 32. While the drawings depict the support links 29 connected to the frame 12 and the rear drive axle 24 fixed to the frame 12, an alternative configuration can suspend the rear drive axle 24 from the frame 12 such that the rear drive axle 24 is vertically movable relative to the frame 12. In such a configuration, the support links 29 would preferably be mounted to the rear drive axle 24 to be vertically movable therewith, but pivotable about an axis that is not coincidental with the axis of the rear drive axle 24. Furthermore, the pivotal connection between the support links 29 and either the frame 12 or the rear drive axle 24, or alternatively the length of support links 29, will be positionally adjustable in a fore and aft direction to provide for adjustment of the tension in the chain drive mechanism 26a, as will be described in greater detail below.

The support beam 32 is also connected to a central support bracket 31 which, in turn, is connected to the rearward end of the bogey beam 30 by a ball joint 33, defining the oscillation axis 33a which permits the middle axle 27 to oscillate about the longitudinally extending axis 33a to permit the middle axle 27 to follow ground undulations. The central support bracket 31 also defines a pivotal connection between the bogey beam 30 and the support beam 32 such that the support beam 32 which is fixed to the central support bracket 31 is free to pivot about a bolt 33b defining a transversely extending pivot axis 31 a that is eccentric with respect to the transverse axis of the middle axle 27. Accordingly, the middle axle 27 is capable of simultaneous pivotal movement about the transverse axis 31 a and the pivotal connections between the support links 29 and the mounting brackets 34. Preferably, the pivotal connection between the support links 29 and the mounting brackets 34 are in alignment with the stub shafts 27a, 27b defining the middle axle 27. The transverse pivot axis 31a is located below the line of the middle axle 27.

The pivotal connection of the support links 29 to the frame 12 (or alternatively to the rear drive axle 24) is preferably formed as an assembly that is longitudinally movable to control the tension in the chain drive mechanism 26a. With specific reference to FIG. 4, the position of the support beam 32 on top of the bogey beam depicts the forwardmost adjustable movement of the support links 29. One skilled in the art will readily recognize that a fore-and-aft movement of the support link 29 will cause pivotal movement of the support beam 32 about the transverse pivot axis 31a carried by the rearward end of the bogey beam 30. Accordingly, the normal operative position of the support beam 32 will be at an orientation above the bogey beam 30 to allow for wear adjustment of the chain mechanism 26a, similar to the solid line depiction in FIG. 6.

Figure 6:
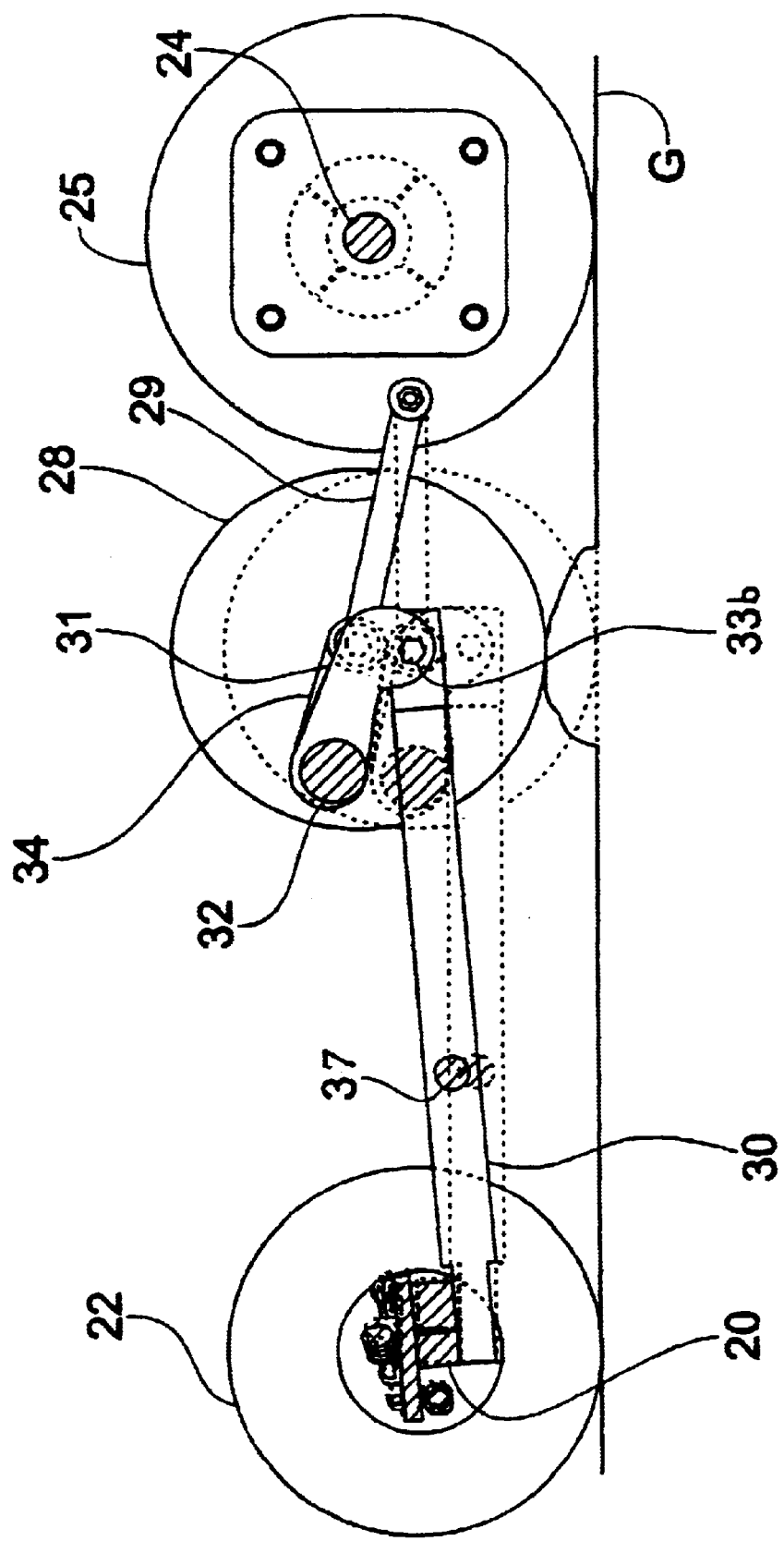
FIG. 6 is an enlarged cross-sectional view similar to that of FIG. 4 but showing flotational movement of the middle axle, the normal position of the middle axle being shown in phantom.

In operation, as best seen in FIGS. 4–6, the middle axle 27 is free to float with respect to frame 12 of the utility vehicle 10. The vertical movement of the middle axle 27 is accommodated by the pivotal connections of the support links 29, the bogey beam 30 and the support beam 32. The support links 29 impose a controlled positional relationship with respect to the movements of the middle axle 27 relative to the rear drive axle 24, thus keeping the chain drive mechanism 26a in a proper drive transferring condition. The support links 29 do not pivot on a center coincident with the rear drive axle 24, but are pivoted at a point forwardly of the rear drive axle 24. Accordingly, the pivotal movement of the middle axle 27, as represented by the arc 29a, will slightly shorten the distance between the middle axle 27 and the rear drive axle 24, thus allowing a little slack in the chain drive mechanism 26a to accommodate a slight twisting of the chain drive mechanism 26a when the middle axle oscillates about the pivot axis 33a. The floating movement of the middle axle 27 about the rearward end of the support links 29, whose pivot axis is forward of the rear drive axle 24, will maintain acceptable tension in the chain drive mechanism 26a for proper drive transmission to the middle axle 27.

Furthermore, the middle axle 27 is mounted on the rearward end of the bogey beam 30 and any vertical floating movement of the middle axle 27 must also move in conjunction with the limits imposed by the bogey beam structure 30, as represented by the arc 30a. Since the support beam 32 is pivotally connected to the rear end of the bogey beam 30 by the central support bracket 31, the support beam 32 is capable of pivoting rearwardly about the pivot axis 31a, as represented by the arc 32a. Accordingly, the middle axle 27 vertically floats through pivot arcs 29a, 30a, and 32a that coordinate to provide substantially vertical movement for the middle axle 27.

The vertical floating movement of the middle axle 27 is best shown in FIG. 6. The normal position of the middle axle 27 is shown in phantom lines, while the raised position of the middle axle 27 to accommodate a ground undulation is shown in solid lines. The vertical movement of the middle axle 27 raises the rearward end of the bogey beam 30, pivoting the bogey beam 30 about the front axle 20, and slightly raises the operator compartment 13 as represented by the vertical movement of the transverse pivot 37. The pivotal movement of the middle axle 27 with respect to the support links 29 results in a corresponding pivotal movement of the central support bracket 31 about pivot axis 31a, causing the support beam 32 to raise above the bogey beam 30. This flotational capability of the middle axle 27 results in a smoother ride for the operator than is known in the prior art construction with the middle axle 27 fixed to the frame 12.

The downward vertical movement of the middle axle 27 results in a similar operation of the pivot arcs 29a, 30a, and 32a. The downward displacement of the middle axle 27 moves the rearward end of the bogey beam 30 downwardly along the arc 30a. The fixed length of the support links 29 results in a pivotal movement of the support beam 32 about the transverse pivot axis 31a, lowering the support beam 32 relative to the bogey beam 30.

Figure 7:
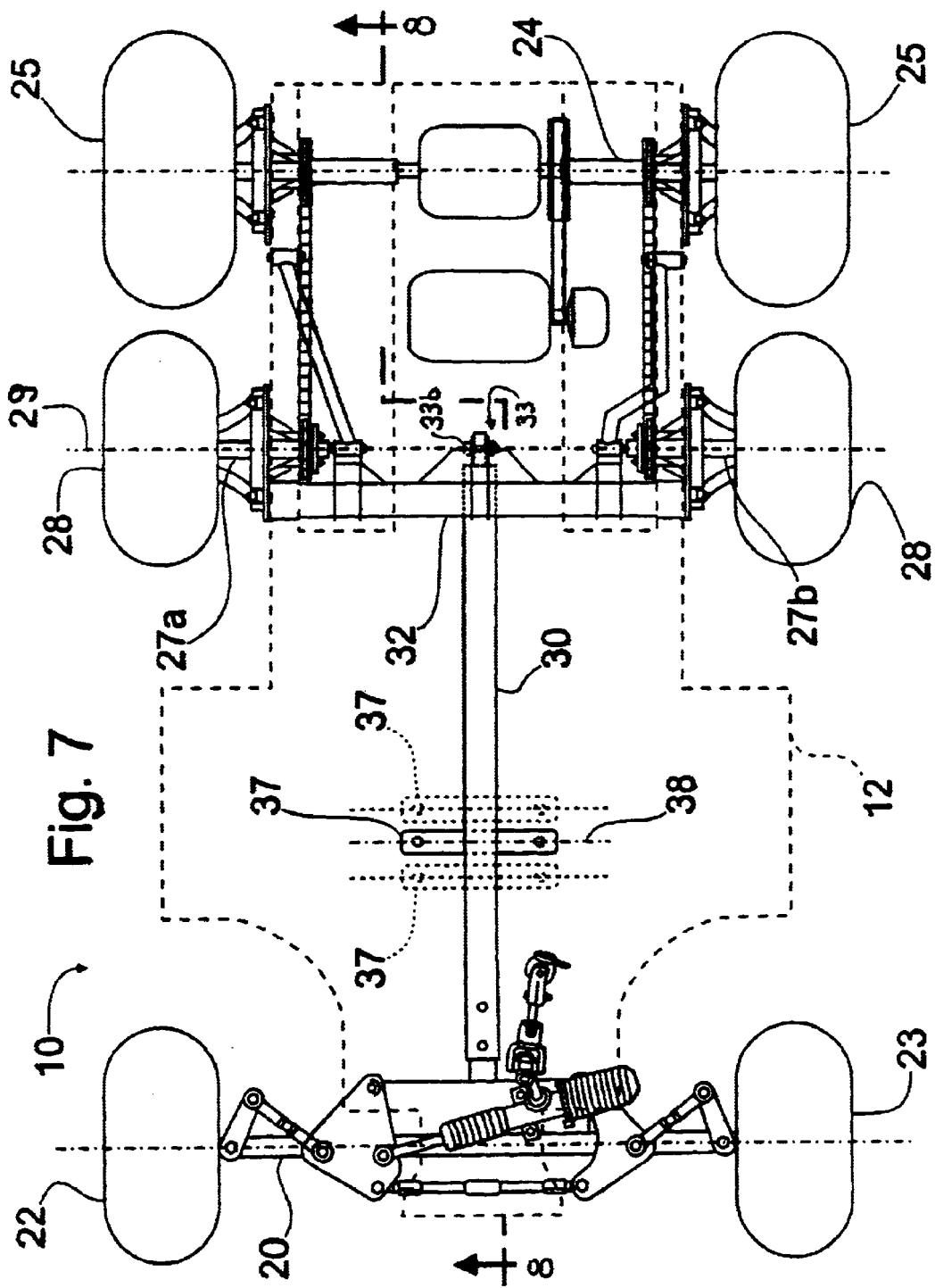
FIG. 7 is a top plan view of the frame similar to that of FIG. 3, but showing variable placement of the bogey beam pivot, alternative bogey beam pivot locations being shown in phantom.
Figure 8:
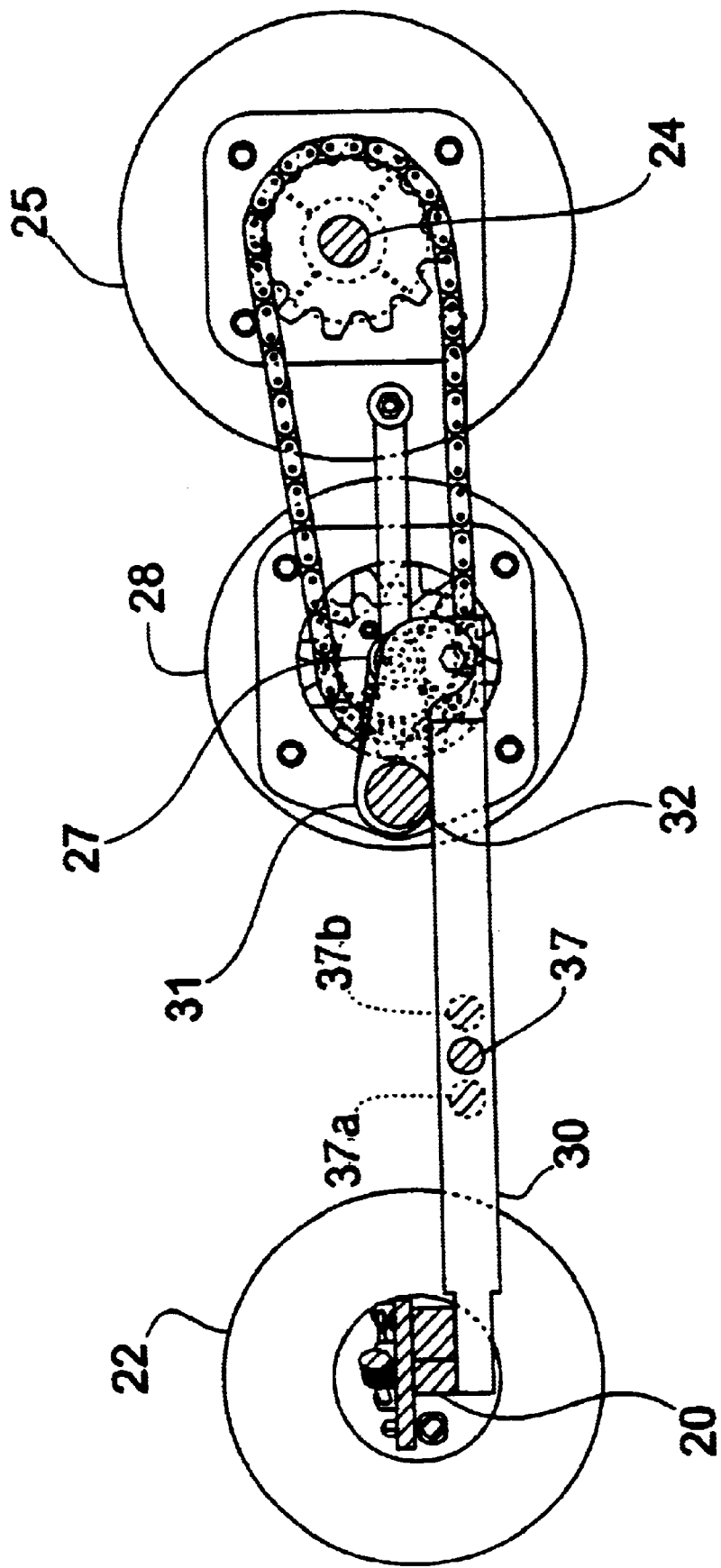
FIG. 8 is an enlarged cross sectional view taken along lines 8—8 of FIG. 7.

An alternative configuration of the pivot assembly 37 can best be seen in FIGS. 7–8. Pivot assembly 37 is selectively movable along the length of bogey beam 30 and mountable to the frame 12 in a plurality of predetermined locations. By changing the location of the pivot assembly 37, the proportions of the load distribution between the front and middle axles 20, 27 can be varied due to the difference in moment arms between the front and middle axles 20, 27 and the pivot axis 38. Changing the load distribution provides a difference in steering characteristics which can be selected by the operator simply by relocating the pivot assembly 37 into one of the alternative openings 37a, 37b in the bogey beam 30. Alternatively, the pivot assembly 37 can be equipped with an automatic adjustment mechanism (not shown) that would effect a relocation of the pivot axis 38 by the operator form the operator compartment 13.

The invention of this application has been described above both generically and with regard to specific embodiments. Although the invention has been set forth in what is believed to be the preferred embodiments, a wide variety of alternatives known to those of skill in the art can be selected within the generic disclosure. The invention is not otherwise limited, except for the recitation of the claims set forth below.

Having thus described the invention, what is claimed is:

1. In a utility vehicle having a frame supported by a steering axle having a pair of steered wheels pivotally mounted thereon, a rear axle supported from the frame and having a pair of wheels mounted thereon, and a middle axle having a pair of support wheels mounted at opposing ends thereof, the improvement comprising:
   a longitudinally extending bogey beam pivotally connected to the frame and having a forward end and a rearward end, said steering axle being connected to said forward end of said bogey beam and said middle axle being connected to said rearward end of said bogey beam;
   a pivot assembly connecting said bogey beam to said frame, said pivot assembly defining a transverse pivot axis about which said bogey beam is pivotable, said pivot axis being selectively positionable along a longitudinal length of said bogey beam.

2. The utility vehicle of claim 1, wherein said pivot assembly is selectively mountable at one of multiple predetermined locations on said frame.

3. The utility vehicle of claim 2, wherein the movement of said pivot axis along the longitudinal length of said bogey beam changes the distribution of a load applied to said bogey beam between said steering and middle axles.

4. The utility vehicle of claim 3, wherein the movement of said pivot axis rearwardly toward said middle axle increases the proportional load distribution on said middle axle.

5. The utility vehicle of claim 4, wherein said bogey beam is formed with a plurality of holes therein for positioning said pivot axis.

6. A utility vehicle comprising:
   a frame;
   a rear axle supported from the frame and having a pair of wheels mounted thereon;
   a steering axle having a pair of steered wheels pivotally mounted thereon;
   a middle axle having a pair of support wheels mounted at opposing ends thereof;
   a longitudinally extending bogey beam having a longitudinal length extending between a forward end supporting said steering axle and a rearward end supporting said middle axle; and
   a pivot assembly connecting said bogey beam to said frame, said pivot assembly defining a transverse pivot axis about which said bogey beam is pivotable, said pivot assembly being selectively mountable at one of multiple predetermined positions along said longitudinal length of said bogey beam.

7. The utility vehicle of claim 6, wherein the movement of said pivot axis along the longitudinal length of said bogey beam changes the distribution of a load applied to said bogey beam between said steering and middle axles.

8. The utility vehicle of claim 7, wherein the movement of said pivot axis rearwardly toward said middle axle increases the proportional load distribution on said middle axle.

9. The utility vehicle of claim 8, wherein said bogey beam is formed with a plurality of holes therein for positioning said pivot axis.

10. In a utility vehicle having a frame supported by a steering axle having a pair of steered wheels pivotally mounted thereon, a rear axle supported from the frame and having a pair of wheels mounted thereon, and a middle axle having a pair of support wheels mounted at opposing ends thereof, the improvement comprising:
    a longitudinally extending bogey beam pivotally connected to the frame and having a forward end and a rearward end, said steering axle being connected to said forward end of said bogey beam and said middle axle being connected to said rearward end of said bogey beam;
    said middle axle being pivotally connected to said bogey beam such that said middle axle is independently movable relative to said bogey beam about a longitudinally extending axis, thereby allowing said middle axle to oscillate in a generally vertical plane relative to said frame; and
    said bogey beam is pivotally connected to said frame by a pivot assembly defining a transverse pivot axis about which said bogey beam is pivotable, said pivot assembly being selectively mountable at one of multiple predetermined positions along a longitudinal length of said bogey beam.

11. The utility vehicle of claim 10, wherein the movement of said pivot axis along the longitudinal length of said bogey beam changes the distribution of a load applied to said bogey beam between said steering and middle axles.

* * * * *